US006697329B1

(12) United States Patent
McAllister et al.

(10) Patent No.: US 6,697,329 B1
(45) Date of Patent: Feb. 24, 2004

(54) OPERATOR DIRECTED ROUTING OF CONNECTIONS IN A DIGITAL COMMUNICATIONS NETWORK

(75) Inventors: Shawn McAllister, Manotick (CA); Mark Tooker, Kanata (CA); Ron Veeneman, Carleton Place (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/321,195

(22) Filed: May 27, 1999

(30) Foreign Application Priority Data

May 28, 1998 (CA) .............................. 2239032

(51) Int. Cl.$^7$ ................................ H04J 12/25
(52) U.S. Cl. ..................................... 370/235
(58) Field of Search ................ 370/217, 218, 370/230, 231, 235, 236, 237, 238, 355, 389, 392, 393, 395, 396, 397, 399, 400, 401, 409

(56) References Cited

U.S. PATENT DOCUMENTS

| | | | | |
|---|---|---|---|---|
| 5,781,529 A | * | 7/1998 | Liang et al. | 370/218 |
| 5,978,372 A | * | 11/1999 | Tsutsui | 370/392 |
| 6,078,575 A | * | 6/2000 | Dommety et al. | 370/338 |
| 6,243,384 B1 | * | 6/2001 | Eriksson et al. | 370/395.31 |
| 6,434,619 B1 | * | 8/2002 | Lim et al. | 709/229 |

FOREIGN PATENT DOCUMENTS

| | | |
|---|---|---|
| EP | 0 798 945 A2 | 10/1997 |
| WO | WO 97/16005 | 5/1997 |

OTHER PUBLICATIONS

Scott, J.M. et al., "ATM Forum's Private Network/Network Interface", BT Technology Journal, BT Laboratories, Great Britain, Apr. 1998, pp. 37–46, vol. 16, No. 2, ISSN 1358–3948, XP000750517.

Black, U. et al., "Private Network–Network Interface (PNNI)", pp. 159–179, in ATM: Signaling in Broadband Networks, vol. II, Prentice Hall Series in Advanced Communications Technologies, Upper Saddle River, New Jersey, U.S.A., ISBN 013–571837–6, XP002080340.

Gremmelmaier, U. et al., "Performance Evaluation of the PNNI Routing Protocol Using an Emulation Tool", XVI World Telecom Congress Proceedings, pp. 401–408, Issue '97, Sep. 21–26, 1997, Toronto, Canada, XP000720545.

"Private Network–Network Interface Specification", Specification Version 1.0 (PNNI 1.0), ATM Forum, document no. af–pnni–0055.00, Mar., 1996.

Alles, A. "ATM Internetworking", Cisco Systems Inc., May 1995.

* cited by examiner

Primary Examiner—Wellington Chin
Assistant Examiner—William Schultz
(74) Attorney, Agent, or Firm—Blake, Cassels & Graydon LLP

(57) ABSTRACT

A virtual circuit whose path across a network is specified by a human operator (hereinafter operator directed route or ODR VC) is established by manually provisioning a preferred path for the connection, including a source node, destination node, and intermediate nodes or subnetworks therebetween. The source node creates a call setup message which is signalled along the preferred path, whereby the intermediate nodes along the preferred path establish the bearer channel cross-connects. The operator also specifies a re-muting scheme for the ODR VC in the event the preferred path is blocked or a link subsequently fails. The re-routing scheme includes one of (a) the preferred path only; (b) at least one manually provisioned alternate path; and (c) any available path. The ODR VC provides the benefit of a permanent virtual circuit (PVC) in terms of the ability to consciously route a connection with the benefit of a soft permanent virtual circuit (SPVC) or switched virtual circuit (SVC) in terms of the capability to efficiently re-route connections by the network as opposed to a central management authority.

20 Claims, 5 Drawing Sheets

OPERATOR DIRECTED ROUTING OF CONNECTIONS IN A DIGITAL COMMUNICATIONS NETWORK

FIELD OF THE INVENTION

The invention generally relates to the art of establishing connections in a network; and more specifically to the establishment of a virtual circuit in an asynchronous transfer mode (ATM) network using an operator-directed routing path.

BACKGROUND OF THE INVENTION

A permanent virtual circuit (PVC) provides a bearer channel path across a network which comprises a series of bearer channel links that are interconnected by "permanent" bearer channel cross-connections established on network nodes under the direction of a central network management authority. This authority can be a human operator which decides the route and manually configures each cross-connection individually through a network management terminal interface (NMTI). Alternatively, the authority can be a network management system (NMS), which automatically selects the route through the network according to some algorithm or objective when requested by one or more human operators. The NMS is connected to each network node typically through an independent control channel and thereby automatically establishes the cross-connections.

For each PVC thus established, the central network management authority can choose a route through the network which meets criteria based on network-wide policies rather than single-element policies. One example of a network-wide routing policy is a policy of using the most efficient route through the network, for example, by minimizing the number of network nodes traversed; or by minimizing the cumulative costs of links which are traversed; or, by balancing the number of traversed nodes and the cost of the traversed links. Another example is balancing network usage across different network nodes, or the links between network node, such that no one network node or link is carrying a large proportion of all PVCs traversing the network.

This approach to establishing connections provides various benefits. For instance, since there is only one central network management authority, i.e. an expert human network operator or a powerful computer running sophisticated network management software, the cost of provisioning the authority is inexpensive relative to the overall cost of the network. In addition, whenever network management policy is changed with respect to the routing of circuits or connections, it is easy to implement the policy changes because they only need to be made in one place, in the central management authority.

This approach also has various shortcomings. One shortcoming is the relatively high cost of maintaining an exact and up-to-date picture of network conditions in the central network management authority in order to enable routing and re-routing decisions to be made with accuracy. Another shortcoming is the slow speed at which the central network management authority can re-route PVCs in the event of a network failure. This is due to the time required for the central authority to (i) become aware of the network failure, (ii) find new routes through the network for all affected PVCs which satisfy all of the various network element and network-wide criteria, and (iii) re-establish all affected PVCs along the chosen routes.

A soft permanent virtual circuit (SPVC) provides a bearer channel path across a network which comprises a series of bearer channel links that are interconnected through "switched" (i.e. on-demand) bearer channel cross-connections made across a series of network nodes. More specifically, the ingress and egress network nodes are provisioned by an operator (either through the NMTI or NMI) but the cross-connects are commissioned via signalling, like a switched virtual connection (SVC), as the SPVC is signalled and routed across the network from the ingress network node to the egress network node. An SVC is a path that is signalled from user side UNI to user side UNI whereby the route is chosen by the network nodes as the path is signalled from a source end station towards a destination end station. The individual cross-connects for the SVC path are configured and connected by call control software running on each node along the path as the path steers itself through the network using routing tables resident on each node (i.e., hop-by-hop routing) or according to a predetermined route specified in the connection request (i.e., source-routing). Thus, SPVCs are a kind of hybrid between PVCs and SVCs since SPVCs, like PVCs, are initiated by the central network management authority and require no UNI signalling between the user and the network, but, like SVCs, the cross-connects are routed through the network and maintained by the network nodes themselves.

One of the benefits of this approach to establishing connections is that SPVCs can be re-routed more efficiently because the network nodes which are closest to a network failure can quickly detect the failure and initiate the re-routing procedures. Hence, the virtual circuits can be re-established more quickly and at less cost than PVCs can be reestablished by a central network management authority. Indeed, it is estimated that SPVCs improve the cult restoration re-route performance for connections by an order of magnitude because the processing is distributed within the network rather than being centrally managed by the NMS.

The are also various disadvantages with this approach. First, it is not possible for an expert human operator to intervene and influence the network nodes to use routes for an SPVC through the network that differ from the mutes that would be automatically chosen by the network nodes, or to modify routes chosen automatically by the network nodes, for example, in order to impose routing criteria for which the network nodes have not been designed or configured. Second, due to the large number of network nodes, it is difficult and costly to employ powerful computing devices for each network node; therefore, the sophistication of the routing algorithms implemented by the network elements cannot, at reasonable expense, approach the sophistication of the routing algorithms that can be implemented by a central network management authority which comprises of a smaller number of computing devices. Third, again due to the large number of network nodes, it is difficult and costly to upgrade or reconfigure each network node whenever a network-wide policy has changed with respect to the routing and re-routing of virtual circuits, for example, when a new virtual network has been created out of available resources on many different nodes across the network, or when network management policies change with respect to the weighting of different criteria such as the number of nodes traversed versus cumulative cost of links traversed.

To further elaborate upon the disadvantages provided by both PVCs and SPVCs, consider for example, the reference network shown in FIG. 1. A customer wishes to connect end station or customer premise equipment (CPE) 20 from Toronto to Montreal, and purchases two (2) connections or virtual circuits 24*a* and 24*b* therebetween to ensure redundancy. If the connections 24*a* and 24*b* between Montreal and Toronto are established using SPVCs, then, since the path, i.e. intermediate nodes 28 and links 26, of the connections are not preconfigured, a situation such as illustrated in FIG. 1 could occur, wherein the network nodes select the shortest path between the CPEs. Thus, the paths of both connections 24a and 24b are identical, traversing node A, link 26ag, node G, link 26dg, and node D. This result would thus destroy the sought after redundancy. In order to ensure that the path of each connection does not follow a common link or share the same physical interface of the other, it is possible to provision the connections as PVCs in order to manually configure the cross-connections and predetermine the followed links. However, this strategy brings with it the above described disadvantages of PVCS, in particular, the relatively slow re-route performance of the centralized NMS in the event of a service disruption such as a failed link. For customers who have demanding maximum permissible service disruption requirements, e.g., one second per year, the re-route performance of PVCs by the NMS is unacceptable. For example, it may take the NMS two hundred (200) seconds to re-route a severed OC-3 cable carrying ten thousand (10,000) connections at fifty (50) re-routes per second.

Similar problems arise in router based network environments such as those networks which employ tag switching or multi-protocol label switching (MPLS).

SUMMARY OF THE INVENTION

The invention seeks to avoid various limitations of the prior art by providing a hybrid type of connection which features the fast, distributed processing re-route capabilities of SVCs or SPVCs, yet enables a human operator to direct the routing of the path across the network like a PVC. Broadly speaking, one aspect of the invention relates to a communications network comprising a user interface means for enabling a human operator to manually provision a predetermined preferred path across the network, which path comprises a source network element, a destination network element, as well as intermediate network elements and, optionally, the intermediate ports or links between these network elements. The user interface means is connected to the source network element which encapsulates the manually provisioned preferred path in a source-routed connection request message that is signalled to the network elements along the preferred path. The network elements include call processing means to ensure that the manually routed connection traverses these intermediate nodes and the specified intermediate links as the connection request is signalled from the source network element to the destination network element.

In a first aspect, a method of establishing a connection between a source network element and a destination network element in a communications network is provided. The source network element is associated with a path selection algorithm for identifying network path elements that define the connection. The method includes:

(a) providing an operator selected preferred routing indication to the source network element, the preferred routing indication defining at least one preferred network path element of the connection located between the source network element and the destination network element;

(b) providing an operator selected re-routing indication, the re-routing indication defining instructions for re-establishing the connection in the event at least one preferred network path element defined by the preferred routing indication becomes unavailable for sustaining the said connection;

wherein the preferred routing indication is used to establish the connection instead of corresponding network path elements identified by the path selection algorithm of the source network element.

The preferred routing indication and the re-routing indication may be originated externally of the source network element, and the re-routing indication may be provided to the source network element. The re-routing indication may include a direction to re-establish the connection using the preferred routing indication.

The method may further include creating a source-routed connection request message which specifies the preferred routing indication, and the source-routed connection request message may be signalled to the destination network element so as to establish the connection.

The communications network may further include a network management element for originating the preferred routing indication, and the source network element may create the source-routed connection request message.

The intermediate network element may be one of a subnetwork, a network node, and a link between two adjacent network elements that are located between the source network element and the destination network element.

The preferred routing indication may be manually predetermined.

The method may further include, establishing a bearer channel cross-connection on each network path element which constitutes a network node in order to connect any two adjacent network elements of the source network element, the destination network element and any network element therebetween which is located along the network path elements that define the connection.

A network path element may include at least one link between two adjacent network elements of the source network element, the destination network element and the network element therebetween that is located along network path elements that define the connection, and the source-routed connection request message specifies the link.

Every two adjacent network elements which constitute network nodes and which correspond to each link may commission a bearer channel cross-connection thereon so as to utilize each link in establishing the connection.

Adjacent network elements of the source network element, the destination network element and each network element therebetween which is located along network path elements that define the connection may automatically select any available link in the event the preferred routing indication does not identify a link to be used therebetween.

The re-routing indication may be stored at the source network element.

The re-routing indication may include at least one alternate path indication each defining at least one network path element of the connection located between the source network element and the destination network element, the alternate path indication not being identical to the preferred routing indication.

The re-routing indication may include a direction to re-establish the connection selected from one of (i) using the preferred routing indication; (ii) using at least one alternate path indication each defining at least one network path element of the connection located between the source network element and the destination network element, each alternate path indication not being identical to the preferred routing indication; (iii) using any possible path from the source network element to the destination network element;

and (iv) using each alternative path indication successively if an earlier used alternative path indication becomes unavailable for sustaining the connection, and if every alternative path indication becomes unavailable as aforesaid, then using any possible path from the source network element to the destination network element.

The communications network may be a P-NNI network and the any possible path may be determined using P-NNI routing techniques.

The source-routed connection request message may be one of (i) an SPVC call setup message; and (ii) an SVC call setup message; which includes a designated transit list (DTL) specifying each preferred network path element of the connection.

The method may further include, cranking back the source-routed connection request message to the source network element for re-routing the connection in the event that any of the at least one link is inoperative during establishing of the connection.

The method may further include, signalling the source network element to re-route the connection in the event that any of said at least one link becomes inoperative after establishment of the connection.

The manual predetermination of the preferred routing indication may be indicated by one of: manually entry; manual with point and click assistance; and automatic route generation with optional manual editing.

ODR SPVCs, having paths provisioned by a human operator, offer the same services as the prior art SPVCs, and provide various other additional benefits. For instance, ODR SPVCs allow the operator to deliberately control the distribution of connections across a network, Additionally, the operator can include or exclude certain nodes(s) from the path of an ODR SPVC for security reasons. For example, a connection may need to traverse certain nodes to ensure the connection is protected from unauthorized access. This offers some degree of information security for the customer. In addition, the operator can setup ODR SPVCs to ensure a network failure will not disrupt all of a customers connections by requiring a certain portion of the customers connections to traverse a certain path while the remainder traverse completely unrelated path(s). If any path(s) experiences failure, the failure would not disrupt all of the customer's connections. Furthermore, ODR SPVCs can be provisioned across a network to ensure that the network is efficient. For example, the operator can direct certain ODR SPVCs to traverse the network over the least amount of hops, thereby guaranteeing that a connection will take the most direct path to its destination. The operator may even direct ODR SPVCs to avoid certain nodes to free up resources and avoid congestion in those nodes.

BRIEF DESCRIPTION OF DRAWINGS

The foregoing and other aspects of the invention will become more apparent from the following description of the preferred embodiment thereof and the accompanying drawings which illustrate, by way of example, the preferred embodiment in the drawings.

DETAILED DESCRIPTION OF PREFERRED EMBODIMENTS

Figure 1:
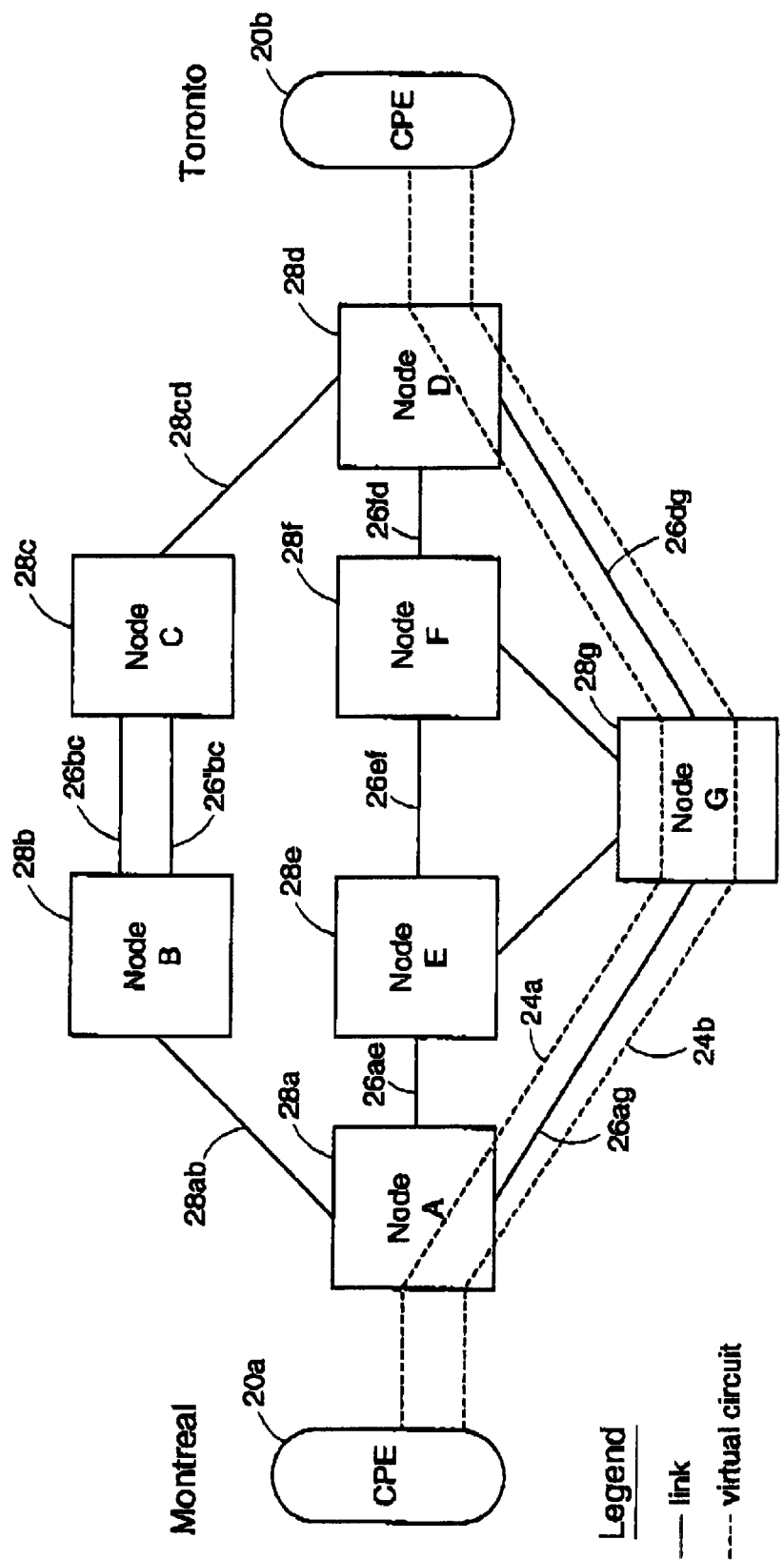
FIG. 1 is a diagram of a reference network.
Figure 2A:
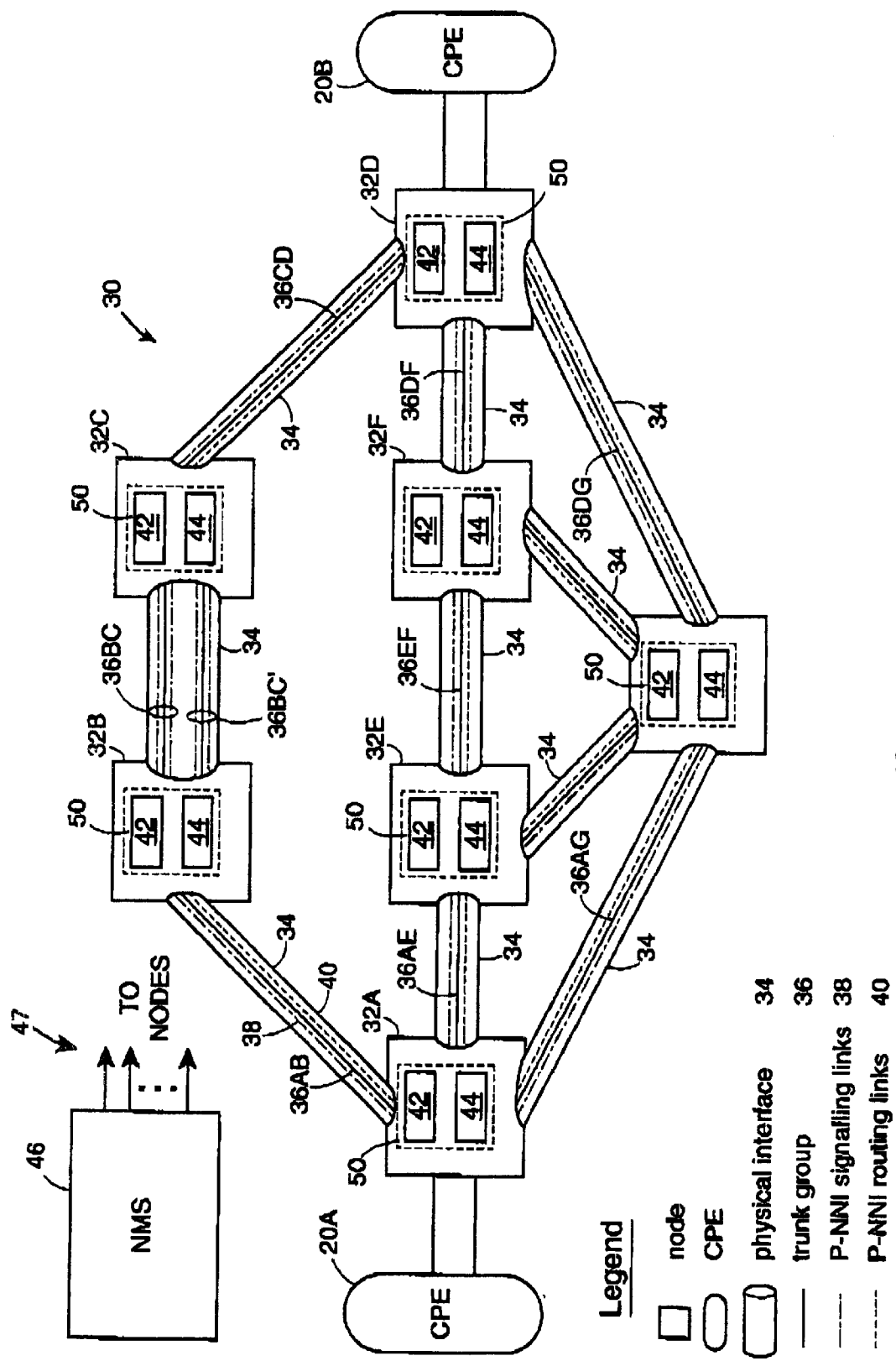
FIG. 2A is a diagram of an P-NNI reference network having the same topology as the network shown in FIG. 1.

FIG. 2A illustrates a reference connection-orientated ATM network 30 having a similar topography to the reference network shown in FIG. 1. The network 30 comprises a plurality of interconnected network elements, including end stations 20 and network nodes 32. For ease of reference, individual nodes are identified by an alphabetical suffix, e.g., A, B or C and referenced elements of a given node are also generally labelled with the same suffix used to identity the node. The nodes 32 include various ports (not shown) which are interconnected through standard physical interfaces 34, such as well known OC-3, OC-12 and DS3 fibre optic or electrical interfaces.

Figure 3:
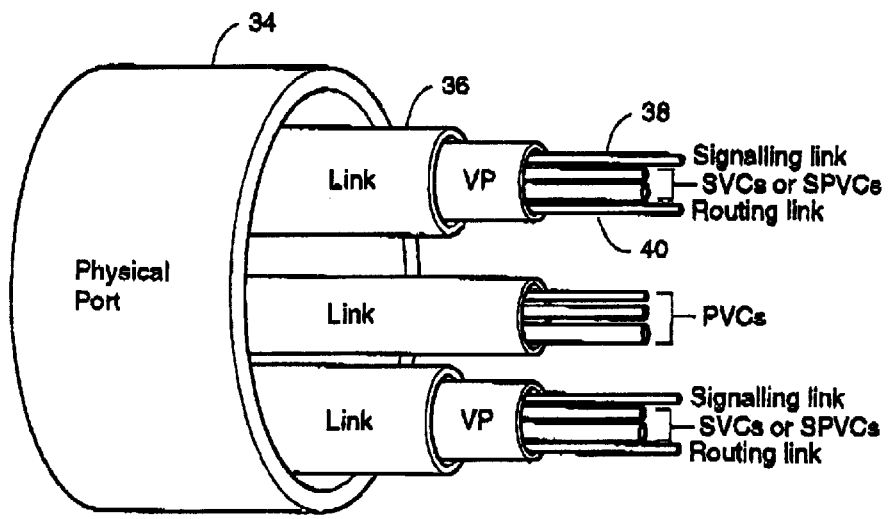
FIG. 3 is a diagram illustrating the logical partitioning of the bandwidth provided by a physical interface, in accordance with the preferred embodiment.

In the preferred embodiment, the nodes 32 interface with one another using the Private Network-to-Network interface (P-NNI) protocol which is described in the reference "Private Network-Network interface Specification Version 1.0 (P-NNI 1.0)", doc. no. af-p-nni-0055.00, March 1996, published by the ATM Forum, and which is incorporated herein by reference in its entirety. The nodes 32 are interconnected by data links 36, each of which represents a pre-allocated portion of the bandwidth provided by the corresponding physical interface 34. (Note that multiple links can be associated with each physical interface spanning adjacent nodes.) In the preferred embodiment, each data link 36 is associated with a P-NNI signalling link 38 and a P-NNI routing link 40, alternatively termed routing control channel (RCC), which span adjacent nodes. FIG. 3 shows more accurately the relationship between a physical port or interface 34, data links 36 (which are alternatively referred to as "trunk groups"), P-NNI signalling links 38, P-NNI routing links 40, SVCs and SPVCs. It will be seen from the foregoing that the data link 36 represents a P-NNI connectivity between two nodes 32.

More specifically, each node 32 comprises a P-NNI signalling module 42 for carrying out a P-NNI signalling protocol, which is based on ATM Forum UNI signalling with extensions to support P-NNI functions. Signalling module 42 communicates over the P-NNI signalling link 38, which may be a designated PVC or SVC associated with the data link 36. Collectively, the signalling modules 42 of the network nodes and associated signalling links 38 therebetween provide a signalling network for forwarding or carrying P-NNI signalling protocol messages, including connection-orientated messages such as the Setup, Connect and Release messages defined in the P-NNI reference, to and between network nodes 32. Similarly, each network node 32 comprises a P-NNI routing module 44 for carrying out a P-NNI routing protocol wherein nodes exchange topology information with one another over the P-NNI routing links 40 in order to dynamically compute paths through the network. The P-NNI routing links 40, which also may be PVCs or SVCs associated with the corresponding data link 36, carry P-NNI routing protocol messages such as Hello, PTSP, Database Summary, PTSE request and PTSPs acknowledgement messages to and from neighbour nodes. Further information regarding the P-NNI routing and signalling protocols may be found in the above-noted P-NNI reference.

The network 30 is also connected to a centralized network management system (NMS) 48 such as described above. In the preferred embodiment, the NMS 46 is connected to the network nodes 32 through a virtual control channel 47 (not entirely shown), but in alternative embodiments the NMS 46 can be connected to the nodes 32 through an overlay control network, e.g., the public telephone network.

The objective of the preferred embodiment is to establish or set up a connection between end stations or customer premise equipment (CPE) 20A and 20B, which may not support signalling, through the network 30. As previously described, the NMS 46 enables a human operator to establish a prior art PVC or SPVC. In the preferred embodiment, however, the NMS 46 merely provides a user interface means to enable a human operator to manually provision the ODR SPVC of the invention. The ODR SPVC according to the preferred embodiment comprises at least two attributes: (a) a manually provisioned preferred or primary path for the connection; and (b) a manually provisioned re-routing restriction or scheme for re-routing the connection in the event the preferred or primary path is blocked or a data link 36 thereof falls therein. In the preferred embodiment the re-routing scheme may, as explained in greater detail below, includes one or more alternate preferred paths which must also be manually provisioned by the operator.

Each path which la manually provisioned by the operator comprises a list of all of the nodes and, optionally, the operator-specified links, the ODR SPVC must traverse to reach its destination endpoint, i.e., the egress node.

The network 30 is associated with an addressing scheme, and thus each node is identified by a unique node identifier, and each data link is represented by a link identifier, which may be local to the node. The format of the link identifier varies depending upon the specific scheme chosen by the manufacturer of the node, but typically represents some sort of numerical identifier with respect to a given node.

Figure 2B:
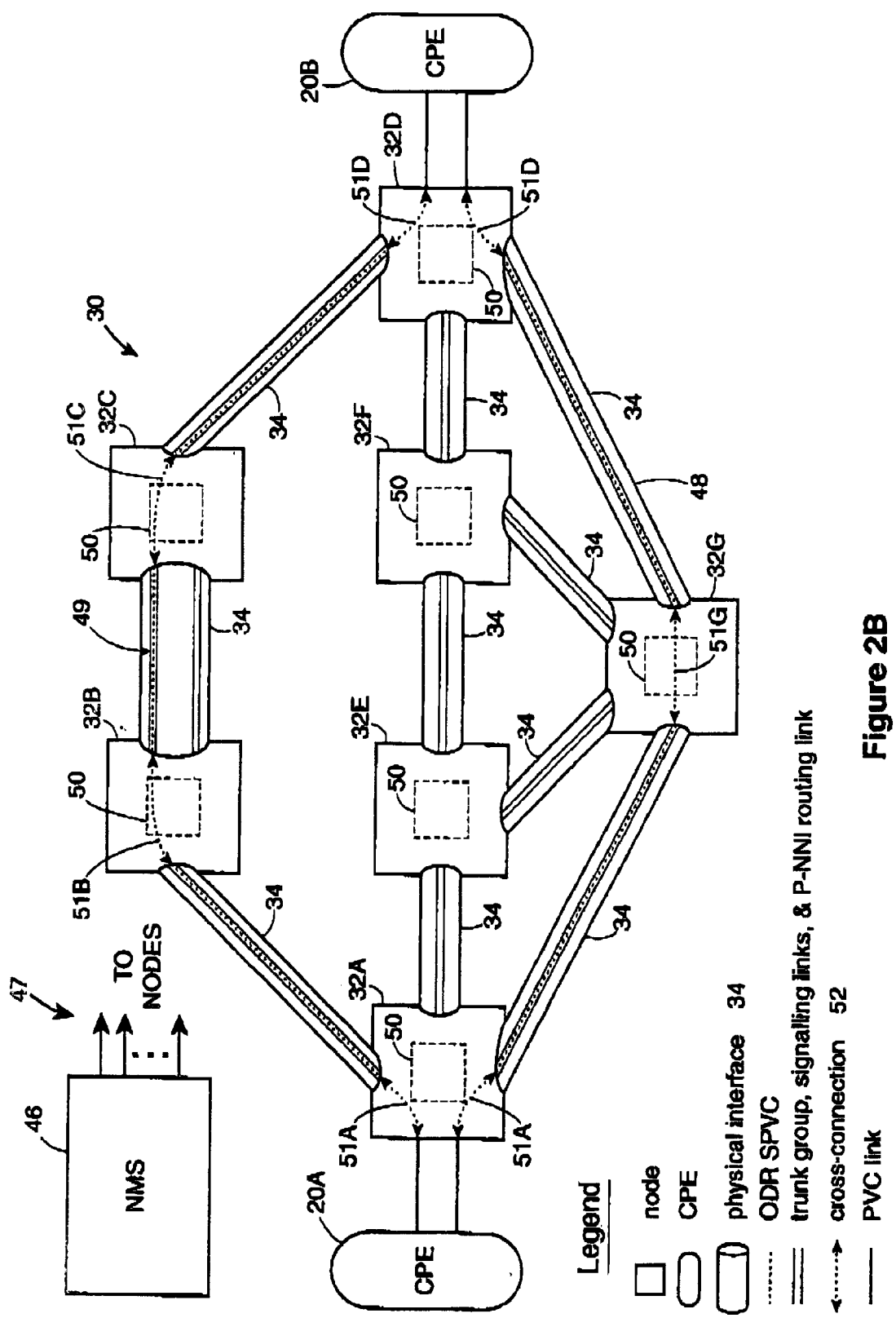
FIG. 2B is a diagram of the P-NNI reference network illustrating desired ODR SPVC paths.

For example, referring to FIG. 2B, in order to ensure redundancy it may be desired to provide one ODR SPVC connection 48 between CPE 20A and CPE 20B through path [node 32A; node 32G; and node 32D], and another ODR SPVC connection 49 between CPE 20A and CPE 20B through path [node 32A; node 32B, link 36BC; node 32C, node 32D]. Thus, the operator uses the NMS 46 to select or confirm the appropriate node and link identifiers for these paths. The operator may also specify or confirm alternate preferred paths for these connections in the event the preferred paths or routes are inoperative. For example, the operator could specify an alternate route for connection 48 as [node 32A, node 32E, node 32F, and node 32D]. Similarly, the alternate route for connection 49 could be [node 32A, node 32B, link 36BC', node 32C; node 32D].

The user interface means provided by the NMS 46 facilitates the input of the ODR SPVC, including the preferred or primary path, the optional alternate path, and the re-routing scheme thereof The user interface means for specifying paths can comprise any of the following methods:

(1) Manual Entry. Here node identifiers and optional link identifiers are manually typed into a terminal separated by predefined demarcation symbols.

(2) Manual with Point-and-Click Assistance. The NMS 46 provides a graphical representation of the network as known in the art per se, and the operator performs "paste" operations to create a list of nodes and optional links for the ODR SPVC path. The actual node and link identifiers are typically hidden from view and replaced by mnemonics which are more readily understood by the operator; nevertheless, the resulting list is specified in the terms of the node identifiers and optional link identifiers.

(3) Automatic Route Generation with Optional Manual Editing. The NMS 46, in a manner similar to the production of a prior art PVC, can automatically generate a path based on predetermined algorithms, such as the shortest path or least cost. This path is displayed, either textually or graphically, to the operator, who may then confirm or edit the path chosen by the software running on the NMS 46.

Similarly, the operator also selects a re-routing restriction or scheme through the user interface means, thereby indicating how strictly an ODR SPVC is restricted to routes along the nodes and links provisioned by the operator when circumstances dictate the ODR SPVC must be re-routed. The preferred re-routing schemes, which are discussed in greater detail below, include:

(a) primary path;
(b) primary path-alternate path;
(c) primary path-any path, and
(d) primary path-alternate path-any path.

The user interface means may alternatively be provided through the NMTI of a source node, although such interfaces tend to be only textually based. Irrespective of whether the user-interface means is provided by the NMS or NMTI, the particular user interface methods specified above are all instances of manual provisioning.

Once the operator has manually provisioned the preferred or primary path, the optional alternate path(s), and the re-routing scheme for the ODR SPVC (i.e. the configuration data), the NMS 46 sends the configuration data and a message over the control channel 47 instructing the ingress node 32A to set up or establish the ODR SPVC. The ingress node 32A stores the ODR SPVC configuration data as described in greater detail below. The signalling module of the ingress node 32A creates a call establishment or connection request message, such as an SPVC Call Setup message specified in Annex C of the P-NNI reference. However, unlike the situation corresponding to the establishment of a prior art SPVC, the ingress node 32A does not automatically compute the designated transit list (DTL) (specifying the source-routed path of an SVC or SPVC) using its P-NNI routing tables. Instead, the ingress node creates a DTL using the ODR SPVC primary path provisioned by the operator. The DTL is included as an information element (IE) in the SPVC Call Setup message.

The SPVC Call Setup message is signalled by the ingress node over the signalling link to the next or following node in the DTL, which in turn forwards the SPVC Call Setup message to a succeeding node listed in the DTL. This pre continues until the egress or destination node receives the SPVC Call Setup message. Each node which receives the SPVC Call Setup message proceeds in the conventional manner to establish or commission a bearer channel cross-connection 51 between an incoming link 34 and an outgoing link 34.

If a link between two nodes has been provisioned by the operator and thus is specified in the DTL, then, subject to local connection admission control (CAC) verification, the nodes establish the bearer channel cross-connections 51 so as to use the specified link or trunk group, and call processing means 50 operating on the nodes (which comprises the signalling module 42 and routing module 44) needs to only select a free VPI and optionally a VCI on the specified data link or trunk group. If, however, the DTL does not specify any data link or trunk group between nodes, then a local routing function in the call processing means 50 selects an available data link or trunk group to carry the ODR SPVC bearer channel thereon. In either event, it will be seen that since the preferred embodiment uses source-routing, as opposed to hop-by-hop routing, to establish a connection, the path assumed by the connection matches the primary or preferred path specified by the operator, provided that path is not blocked, as discussed in greater detail below.

Once the destination or egress node 32D receives the SPVC Call Setup message, it returns an acknowledgement message back over the signalling network to inform the ingress or source node 32A that the ODR SPVC connection has been successfully established. The source or ingress node 32A then sends a message back over the control channel 47 to the NMS 46 which informs the human operator that the ODR SPVC has been successfully established. Thereafter, the operator may configure the CPE 20A and 20B and ingress and egress network nodes as known in the art per se to transmit data over the recently established ODR SPVC. It will be seen that since the ingress or source node 32A stores the configuration data for and initiates the ODR SPVC, the nature of the ODR SPVC is transparent to the remainder of the network 30 and it appears thereto that a conventional SPVC has been requested and established.

The re-route restrictions associated with the ODR SPVC are enforced whenever the network 30 detects that the preferred or primary path of the ODR SPVC is inoperative. This may occur when (a) the ODR SPVC is being initially established and the call setup is blocked along the preferred path, or (b) once the ODR SPVC is up and running and a link failure occurs.

In the first case, it is possible, for example, that the CAC processing of an intermediate node in the primary path of the ODR SPVC reports insufficient node resources to progress the ODR SPVC through the intermediate node or a specified link thereon in which case the primary path is blocked. In such circumstances, the P-NNI signalling protocol provides a crankback procedure wherein a connection request which is blocked along a selected path is rolled back to a prior node, such as a DTL-creating node (which is node 32A in the reference network), in order to compute another path to an SPVC destination endpoint. The P-NNI crankback procedure is initiated by the network node which detects the block. This node sends a signal indicative of a blocked path, such as a connection clearing message having a crankback IE, back to the source node over the signalling network. The protocol allows a DTL-originating node, such as the source node 32A, which receives this message to re-route the connection using a different path.

Figure 4:
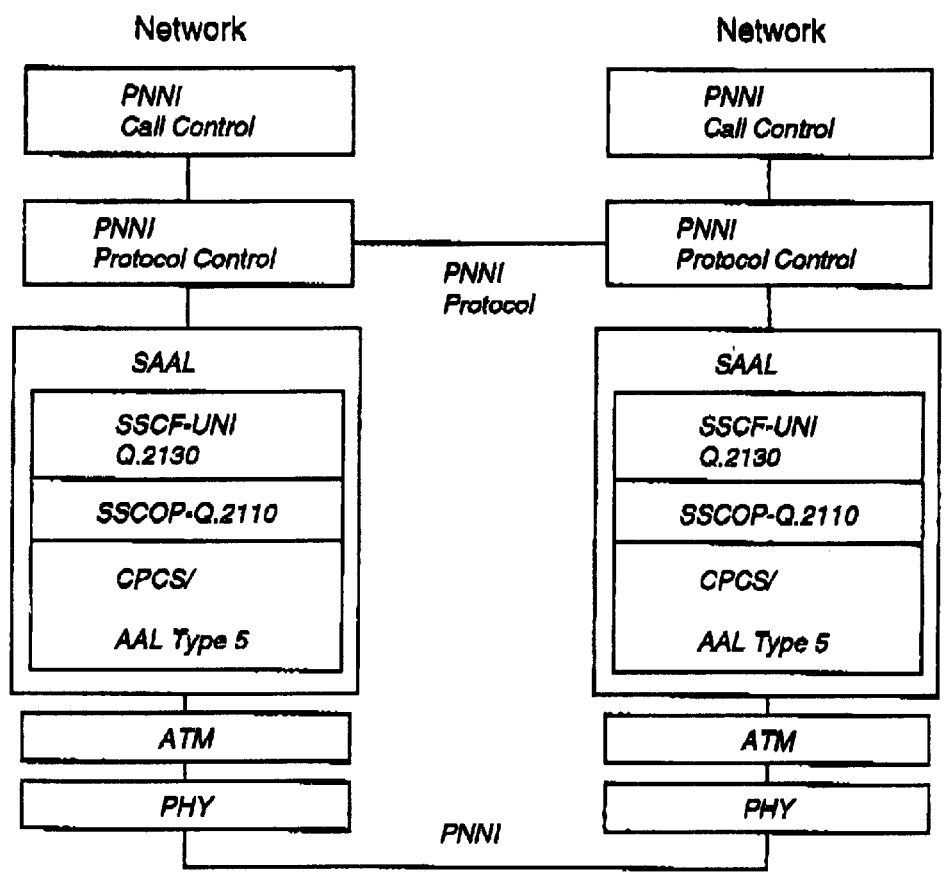
FIG. 4 is a diagram of a P-NNI control plane.

In the second case, the failure of a link in the preferred path of the ODR SPVC may be detected by the normal operation of the P-NNI links 38 and 40. For example, the P-NNI signalling protocol uses the services of the UNI signalling ATM adaption layer 2 (SAAL) (layer 2 in the P-NNI Control Plane shown in FIG. 4) for ensuring a reliable signalling link 38 between nodes. The SAAL protocol constantly sends some protocol messages or data units (PDUs) to a node on the other side of the link which must be acknowledged by the other node. These messages may be sequenced data PDUs, i.e. PDUs which carry layer 3 P-NNI signalling messages for all virtual connections associated with a data link 36, or separately sequenced "poll" and "stat" PDUs. In combination, these messages implement a keep-alive or heartbeat polling process associated with each successive pair of nodes along the path of a call or virtual connection in order to inform each node in the path that the links to neighbour nodes are alive and functioning. Furthermore, the P-NNI routing protocol employs mechanisms such as flooding, sequence number exchange, "lock step" acknowledgements and check sums to ensure reliable and timely delivery of P-NNI topology state packets (PTSPs). When a link failure is detected, the P-NNI protocols dictate that the functioning part of the network transmit a signal indicative of the failure, such as one of the P-NNI connection clearing messages, to the source or ingress node, specifying the cause for the release. Upon receipt of this signal, the source node may attempt to re-route the connection along a different path.

The following illustrates recovery operation, whether invoked during call setup caused by a blocked path or during call tear-down caused by a link failure. In the preferred embodiment, when the source node 32A receives a signal indicative of the blocked path or link failure, such as provided by one of the P-NNI connection clearing messages, the source node first determines whether the blocked path is associated with ODR SPVCs managed by the node. If so, the source node attempts to re-initiate the establishment of each such ODR SPVC in accordance with its associated re-routing restriction, as follows:

Primary Path

Under the primary path re-routing scheme, the ODR SPVC is restricted to being re-routed only along the nodes and links in its primary path. Failure to route the ODR SPVC along this path will result in the crankback of the connection to its source node. At this point the source node either immediately attempts to re-route, i.e., re-initiate the connect request of, the ODR SPVC along the nodes and links in its primary path or waits an interval of time before attempting to reestablish the ODR SPVC.

If the failure is due to a link not specified by the operator, the source node immediately re-routes the ODR SPVC along the nodes and links in the primary path. This is done to give the network nodes another opportunity to immediately set up the connection along the nodes and links in the primary path whenever parallel links exist in the area of the link failure. If parallel links exist in the area of the link failure, the appropriate node's call processing means selects a link other than the failed link. The node attempts to commission its cross-connect to ensure the ODR SPVC traverse this new fink as it is signaled to the next node in the primary path. If this re-route fails, the connection is cranked back to the source node. At this point the source node waits an interval of time before re-routing the ODR SPVC.

After the waiting interval elapses, the source node re-initiates the ODR SPVC using the sequence of events described above. Successive attempts to re-route the ODR SPVC using the primary path will result in the source node increasing the interval of time before repeating this sequence. The source node strives to setup the ODR SPVC along the nodes and specified links in its primary path until it is successful.

It should be noted that a node failure along the specified path results in the source node attempting to re-route the ODR SPVC along its primary path. However, the re-route will not succeed unless the failed node is restored. The network nodes are unable to re-route the ODR SPVC on nodes not explicitly specified by the operator because this re-routing scheme restricts the ODR SPVC to routes along the nodes in the primary path. A link failure along this path results in the source node re-routing the ODR SPVC along its primary path. However, the success of the re-route depends on the configuration of the primary path of the ODR SPVC; the configuration of the network in the area of the failure; and the status of the failed link at the time of the re-route.

The re-route may succeed if the operator explicitly selected the failed link as part of the primary path and the failed link is restored when the appropriate node re-routes the ODR SPVC over the link. If the link is not restored and parallel links exist between the adjacent nodes, the node will not re-route the ODR SPVC around this link failure because this re-routing scheme restricts the ODR SPVC to the links specified by the operator.

The re-route may succeed if the link is the sole link between adjacent nodes in the primary path and it is restored when the appropriate node re-routes the ODR SPVC over the link. In this case it does not matter whether the operator explicitly selected the link as part of the primary path. Since this link is the only link between the adjacent nodes (i.e., parallel links do not exist between the adjacent nodes), the re-route will not succeed until the failed link is restored.

The re-route may succeed if the operator did not select the failed link as part of the primary path and parallel links exist between the adjacent nodes. If the failed link is not restored, the appropriate node's call control software will select a link other than the failed link and attempt to commission its cross connects to ensure the ODR SPVC traverses this new link as it is signalled to the next node in the primary path.

Primary Path-alternate Path

Under the primary path-alternate path re-routing scheme, an ODR SPVC is restricted to being re-routed only along the nodes and specified links in its primary path or alternate path. Since the primary path is the preferred path of an ODR SPVC, the source node will attempt to set up the ODR SPVC on this path first. Failure to route the ODR SPVC along the nodes and links in this path will result in the crankback of the connection to its source node. At this point the source node either immediately re-routes the connection along the nodes and links in its primary path or immediately re-routes the connection along the nodes and links in its alternate path.

If the failure is due to a link not specified by the operator, the source node immediately re-routes the ODR SPVC along its primary path. This is done to give the network nodes another opportunity to immediately set up the connection along the nodes and links in the primary path whenever parallel links exist in the area of the link failure. If parallel links exist in the area of the link failure, the appropriate node's call processing means selects a link other than the failed link. The node attempts to commission its cross connect to ensure the ODR SPVC traverses this new link as it is signalled to the next node in the primary path. If the re-route fails, the connection is cranked back to the source node. At this point the source code immediately re-routes the connection along the nodes and links in its alternate path.

Failure to re-route the ODR SPVC along the nodes and links in its alternate path will result in the crankback of the connection to its source node. At this point the source node either immediately re-routes the ODR SPVC along the nodes and links in its alternate path or waits an interval of time before re-routing the ODR SPVC. If the failure is due to a link not specified by the operator, the source node immediately re-routes the ODR SPVC along its alternate path. This is done to give the network elements another opportunity to immediately set up the connection along the nodes and links in the alternate path wherever parallel links exist in the area of the link failure. If parallel links exist in the area of the link failure, the appropriate node's call control software selects a link other than the failed link. The node attempts to commission its cross connect to ensure the ODR SPVC traverses this new link as it is signalled to the next node in the alternate path. If this re-route falls, the connection is cranked back to the source node. At this point the source node waits an interval of time before re-routing the ODR SPVC.

After the waiting interval elapses, the source node re-routes the ODR SPVC using the sequence of events described above. Successive attempts to re-route the ODR SPVC using the primary path-alternate path sequence will result in the source node increasing the interval of time before repeating the sequence. The source node strives to setup the connection along the nodes and links in its primary path or alternate path until it is successful.

Primary Path-any Path

Under the primary path-any path re-routing scheme, the source node attempts to route an ODR SPVC along the nodes and links in its primary path first. Failure to route the ODR SPVC along this path will result in the crankback of the connection to its source node. At this point the source node either immediately re-routes the ODR SPVC along the nodes and links in its primary path or immediately re-routes the ODR SPVC using conventional SPVC routing (i.e., using SVC routing).

If the failure is due to a link not specified by the operator, the source node immediately re-routes the ODR SPVC along its primary path. This is done to give the network elements another opportunity to immediately set up the connection along the nodes and links in the primary path whenever parallel links exist in the area of the link failure. If parallel links exist in the area of the link failure, the appropriate node's call control software selects a link other than the failed link. The node attempts to commission its cross connect to ensure the ODR SPVC traverses this new link as it is signalled to the next node in the primary path. If the re-route falls, the connection is cranked back to the source node. At this point the source node immediately re-routes the ODR SPVC via conventional SPVC or SVC routing.

If SVC routing falls, the source node waits an interval of time before re-routing the ODR SPVC. After the time elapses, the source node re-routes the ODR SPVC using the sequence of events described above. Successive attempts to re-route the ODR SPVC using the primary path-any path sequence will result in the source node increasing the interval of time before repeating the sequence. The source node strives to setup the connection until it is successful.

Primary Path-alternate Path-any Path

Under the primary path-alternate path-any path re-routing scheme, the source node will attempt to set up the ODR SPVC on the primary path first. Failure to route the ODR SPVC along the nodes and links in this path will result in the crankback of the connection to its source node. At this point the source node either immediately re-routes the connection along the nodes and links in its primary path or immediately re-routes the connection along the nodes and links in its alternate path.

If the failure is due to a link not specified by the operator, the source node immediately re-routes the ODR SPVC along its primary path. This is done to give the network nodes another opportunity to immediately set up the connection along the nodes and links in the primary path whenever parallel links exist in the area of the link failure. If parallel links exist in the area of the link failure, the call processing means of appropriate node selects a link other than the failed link. The node attempts to commission its cross connect to ensure the ODR SPVC traverses this new link as it is signalled to the next node in the primary path. If the re-route fails, the connection is cranked bask to the source node. At this point the source node immediately re-routes the connection along the nodes and links in its alternate path.

Failure to re-route the ODR SPVC along the nodes and links in its alternate path will result in the crankback of the connection to its source node. At this point the source node either immediately re-routes the ODR SPVC along the nodes and links in its alternate path or immediately re-routes the ODR SPVC via SVC routing. If the failure is due to a link not specified by the operator, the source node immediately re-routes the ODR SPVC along its alternate path. This is done to give the network nodes another opportunity to immediately set up the connection along the nodes and links in the alternate path whenever parallel links exist in the area of the link failure. If parallel links exist in the area of the link failure, the appropriate node's call processing means selects a link other than the failed link. The node attempts to commission its cross connect to ensure the ODR SPVC traverses this new link as it is signalled to the next node in the alternate path. If the re-route falls, the connection is cranked back to the source code. At this point the source node immediately re-routes the ODR SPVC via conventional SPVC or SVC routing.

If SVC routing falls, the source node waits an interval of time before re-routing the ODR SPVC. After the waiting interval elapses, the source node re-routes the ODR SPVC using the sequence of events described above. Successive attempts to re-route the ODR SPVC using the primary path-alternate path-any path sequence will result in the source node increasing the interval of time before repeating the sequence. The source node strives to set up the connection until it is successful.

Figure 5:
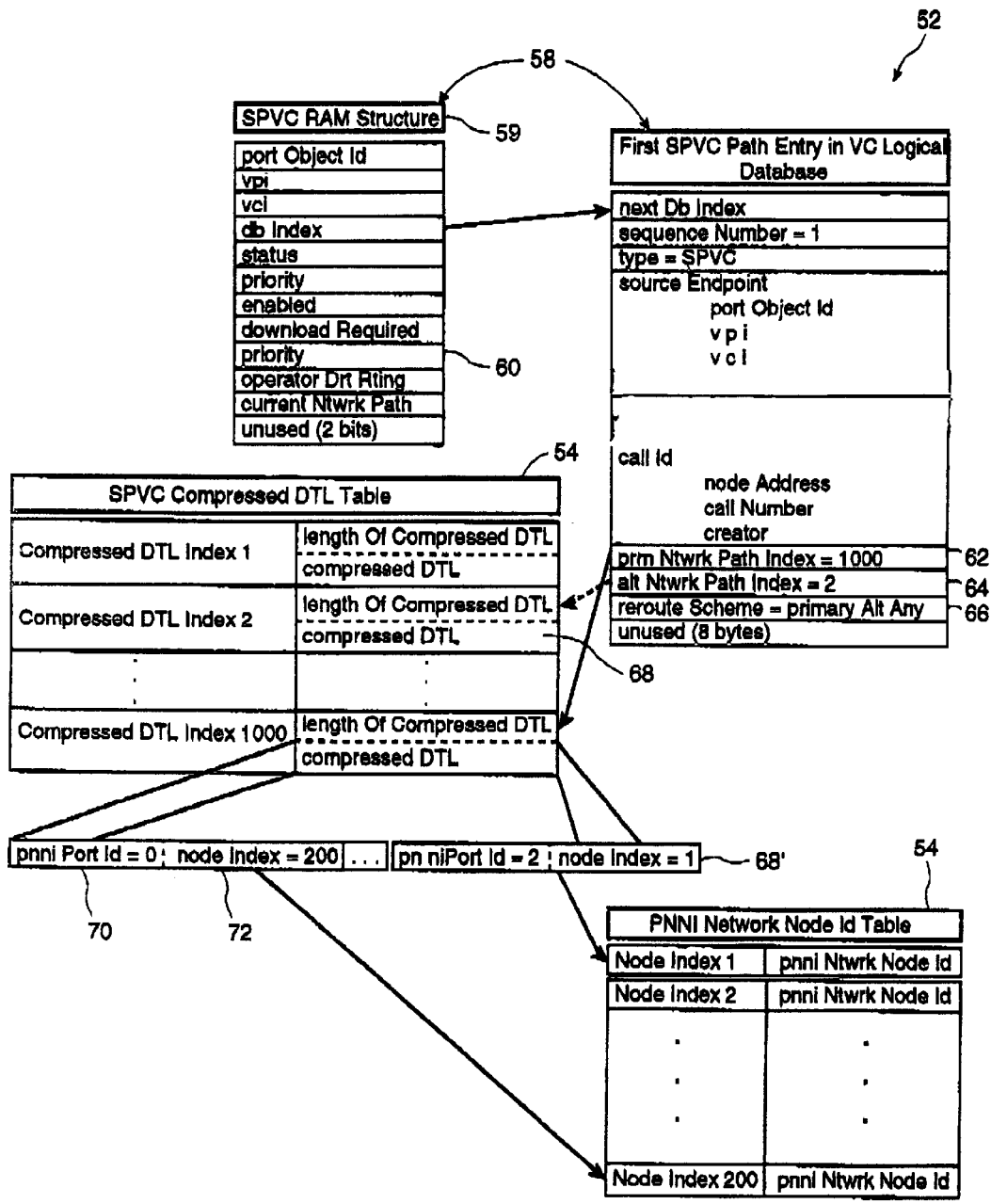
FIG. 5 is a database relationship diagram illustrating how an ODR SPVC is represented in a database on a source node in accordance with the preferred embodiment.

FIG. 5 illustrates a preferred relational database structure 52 used by a given network node 32 to keep track of ODR SPVCs managed thereby. The node database structure includes the following tables: (a) an indexed table 54 of P-NNI network node identifiers; (b) an indexed table 56 of "compressed" ODR SPVC DTLs, as explained in greater detail below, and an ODR SPVC list 58, part 59 of which is stored in random access memory. The ODR SPVC database 52 includes one record for each ODR SPVC which has originated from or is managed by the node. Each ODR SPVC record includes:

(a) an "operatorDrtRtng" field 60 which specifies whether the corresponding ODR SPVC is a conventional SPVC or an ODR SPVC;

(b) a "prmNtwrkPathIndex" field 62 which points to an entry in the compressed DTL table that represents the primary path of an ODR SPVC;

(c) a "altNtwrkPathIndex" field 64 which points to the alternate path entry in the compressed DTL table for the ODR SPVC; and (d) a "re-route scheme" field 66 which stores the re-route scheme for the ODR SPVC.

In this manner, the source node of an SPVC can determine whether the SPVC is an ODR SPVC, and, if so, determine the attributes associated with the ODR SPVC in order to take appropriate action in the event of link failure.

The compressed DTL table 56 has a "compressed DTL" field 68 for storing network paths in a compressed format. A compressed network path is illustrated in greater detail at reference no. 68' and comprises a sequence of link identifiers (i.e. P-NNIPortIdfield 70), and pointers 72 to the node table 54. In the preferred embodiment, P-NNIPortId=0 signifies that no link has been specified by the operator, whereby intermediate nodes in the path of the ODR SPVC are free to select whichever link is available on the node.

Those skilled in the art will appreciate that in the P-NNI routing protocol a "node" can in fact represent an entire subnetwork or "peer group". For example, a node identifier may be a sub-prefix of an ATM node address (itself a prefix of an end system ATM address) which summarizes the reachability of all nodes in the subnetwork or peer group. The NMS 46, however, is typically connected to each node in an entire network, including the nodes in the subnetworks thereof, so that the operator can be made aware of and manually select each physical switching element, and optionally, the links, in each subnetwork along the path of an ODR SPVC. In this case, the DTL in SPVC Call Setup message will specify the complete path (i.e., at least each and every physical switch) to the SPVC destination end point. In this embodiment, since the complete path is specified in the DTL, in the event of a link failure, the crankback procedures discussed previously operate to crank back the connection request back to the originating source node.

Alternatively, however, the operator may specify a subnetwork in the path of the ODR SPVC, without detailing the specific nodes to be traversed in the subnetwork. In this case, the node at the entry to the poor group or subnetwork (hereinafter the "entry border node") computes the path through the subnetwork to a following node or subnetwork specified in the DTL of the SPVC Call Setup message. In such an alternative embodiment, in the event of a link failure in the subnetwork, the aforementioned P-NNI crankback procedures operate to crankback the connection request to the entry border node of subnetwork (since it is a DTL originator), whereby the entry border node may compute an alternate path through the subnetwork to reach the following node or subnetwork specified in the DTL of the connection request if the reroute is unsuccessful, the entry border node then cranks the connection request back to the originating source node so that it may apply the ODR SPVC reroute scheme.

The preferred embodiment has described an ODR connection for an SPVC. Those skilled in the art will appreciate that the invention may alternatively be applied in relation to SVCs, wherein the ingress network node transmit the ODR source-routed call setup message across the network. Alternatively, the user interface means may communicate directly with the end-station and the SVC call setup message may carry the manually routed connection path(s) and re-routing restrictions. It will also be understood that the invention may be applied in relation to SVC or SPVC point-to-multipoint and multipoint-to-point connections, wherein each leaf is separately set up using a separate connection request message. Furthermore those skilled in the art will appreciate that the invention may be applied in relation to router based (i.e. layer 3 switching) network environments such as tag switching or multiprotocol label switching (MPLS) networks which feature source routed connection setups. Similarly, those skilled in the art will appreciate that numerous other modifications and variations may be made to the preferred embodiments described above without departing from the spirit and scope of the invention.

What is claimed is:

1. A method of establishing a connection between a source network element and a destination network element in a communications network, the source network element being associated with a path selection algorithm for identifying network path elements that define the said connection, the method comprising:

(a) providing an operator selected preferred routing indication to the source network element, the preferred routing indication defining at least one preferred network path element of the said connection located between the source network element and the destination network element;

(b) providing an operator selected re-routing indication, the re-routing indication defining instructions for re-establishing the connection in the event at least one preferred network path element defined by the preferred routing indication becomes unavailable for sustaining the said connection; and wherein the preferred routing indication is used to establish the said connection instead of corresponding network path elements identified by the path selection algorithm of the source network element.

2. The method according to claim 1, the method further including, creating a source-routed connection request message which specifies the preferred routing indication, and wherein the source-routed connection request message is signalled to the destination network element so as to establish the said connection.

3. The method according to claim 2, wherein the communications network further includes a network management element for originating the preferred routing indication, and wherein the source network element creates said source-routed connection request message.

4. The method according to claim 3, wherein said at least one network path element comprise one of:

a subnetwork;

a network node; and a link between two adjacent network elements that are located between the source network element and the destination network element.

5. The method according to claim 4, wherein the preferred routing indication is manually predetermined.

6. The method according to claim 5, the method further including, establishing a bearer channel cross-connection on each said network path element which constitutes a network node in order to connect any two adjacent network elements of the source network element, the destination network element and any network element therebetweem which is located along network path elements that define said connection.

7. The method according to claim 5, wherein said manual predetermination of said preferred routing indication is indicated by one of:

manually entry;

manual with point and click assistance; and automatic route generation with optional manual editing.

8. The method according to claim 6, wherein said at least one network path element includes at least one link between two adjacent network elements of the source network element, the destination network element and any network element therebetween that is located along network path elements that define said connection, and wherein the source-routed connection request message specifies the link.

9. The method according to claim 8, wherein every said two adjacent network elements which constitute network nodes and which correspond to each said link commissions a bearer channel cross-connection thereon so as to utilize each said link in establishing the connection.

10. The method according to claim 9, wherein adjacent network elements of the source network element, the destination network element and each network element therebetween which is located along network path elements that define said connection automatically select any available link in the event the preferred routing indication does not identify a link to be used therebetween.

11. The method according to claim 3, wherein the re-routing indication is stored at the source network element.

12. The method according to claim 11, wherein the re-routing indication comprises at least one alternate path indication each defining at least one network path element of the said connection located between the source network element and the destination network element, the alternate path indication not being identical to the preferred routing indication.

13. The method according to claim 12, wherein the re-routing indication comprises a direction to re-establish the connection using the preferred routing indication.

14. The method according to claim 11, wherein the re-routing indication comprises a direction to re-establish the connection selected from one of (i) using the preferred routing indication; (ii) using at least one alternate path indication each defining at least one network path element of the said connection located between the source network element and the destination network element, each alternate path indication not being identical to the preferred routing indication; (iii) using any possible path from the source network element to the destination network element; and (iv) using each said alternate path indication successively if an earlier used alternate path indication becomes unavailable for sustaining said connection and, if every said alternate path indication becomes unavailable as aforesaid, then using any possible path from the source network element to the destination network element.

15. The method according to claim 14, wherein the communications network is a PNNI network and the any possible path is determined using PNNI routing techniques.

16. The method according to claim 15, wherein the source-routed connection request message is one of (i) an SPVC call setup message; and (ii) an SVC call setup message; which includes a designated transit list (DTL) specifying each said preferred network path element of said connection.

17. The method according to claim 16, the method further including cranking back the source-routed connection request message to the source network element for re-routing the connection in the event that any of said at least one link is inoperative during establishment of said connection.

18. The method according to claim 16, the method further including signalling the source network element to re-route the connection in the event that any of said at least one link becomes inoperative after establishment of said connection.

19. The method according to claim 1, wherein the preferred routing indication and the re-routing indication are originated externally of the source network element.

20. The method according to claim 19, wherein the re-routing indication is provided to the source network element.

* * * * *